(12) United States Patent
Ativanichayaphong et al.

(10) Patent No.: US 8,768,711 B2
(45) Date of Patent: Jul. 1, 2014

(54) METHOD AND APPARATUS FOR VOICE-ENABLING AN APPLICATION

(75) Inventors: Soonthorn Ativanichayaphong, Boca Raton, FL (US); Charles W. Cross, Jr., Wellington, FL (US); Brien H. Muschett, Palm Beach Gardens, FL (US)

(73) Assignee: Nuance Communications, Inc., Burlington, MA (US)

( * ) Notice: Subject to any disclaimer, the term of this patent is extended or adjusted under 35 U.S.C. 154(b) by 1493 days.

(21) Appl. No.: 10/870,517

(22) Filed: Jun. 17, 2004

(65) Prior Publication Data

US 2005/0283367 A1 Dec. 22, 2005

(51) Int. Cl.
| | | |
|---|---|---|
| *G10L 15/00* | (2013.01) | |
| *G10L 21/00* | (2013.01) | |
| *G10L 25/00* | (2013.01) | |
| *G06F 3/00* | (2006.01) | |
| *H04M 1/64* | (2006.01) | |
| *H04M 11/00* | (2006.01) | |

(52) U.S. Cl.
USPC ........... 704/275; 704/231; 704/235; 704/246; 704/251; 704/270; 704/258; 704/234; 704/239; 704/270.1; 715/234; 715/239; 379/88.01; 379/88.14; 379/88.17

(58) Field of Classification Search
CPC ....... H04M 3/493; G10L 15/26; G10L 15/00; G10L 15/22; G10L 15/223; G10L 15/225; G10L 15/228
USPC .............. 704/270, 270.1, 258, 275, 231, 235, 704/246, 251; 715/234, 239; 379/88.01, 379/88.14, 88.17
See application file for complete search history.

(56) References Cited

U.S. PATENT DOCUMENTS

| | | | | |
|---|---|---|---|---|
| 6,470,317 B1* | 10/2002 | Ladd et al. | .................... | 704/275 |
| 6,578,000 B1* | 6/2003 | Dodrill et al. | ................. | 704/270 |
| 6,604,075 B1 | 8/2003 | Brown et al. | | |
| 6,636,831 B1* | 10/2003 | Profit et al. | .................... | 704/275 |
| 6,807,529 B2* | 10/2004 | Johnson et al. | ............ | 704/270.1 |

(Continued)

FOREIGN PATENT DOCUMENTS

| | | |
|---|---|---|
| JP | 2002169585 | 6/2002 |
| WO | WO99/48088 | 9/1999 |
| WO | WO02/091364 | 11/2002 |

OTHER PUBLICATIONS

Teppo, A., and Vuorimaa, P.: Speech interface implementation for XML browser. International Conference on Auditory Display, Espoo, Finland, Jul.-Aug., 2001. http://citeseer.ist.psu.edu/teppo01speech.html.*

(Continued)

*Primary Examiner* — Paras D Shah
(74) *Attorney, Agent, or Firm* — Wolf, Greenfield & Sacks, P.C.

(57) ABSTRACT

A method of voice-enabling an application for command and control and content navigation can include the application dynamically generating a markup language fragment specifying a command and control and content navigation grammar for the application, instantiating an interpreter from a voice library, and providing the markup language fragment to the interpreter. The method also can include the interpreter processing a speech input using the command and control and content navigation grammar specified by the markup language fragment and providing an event to the application indicating an instruction representative of the speech input.

14 Claims, 2 Drawing Sheets

(56) References Cited

U.S. PATENT DOCUMENTS

| | | | |
|---|---|---|---|
| 6,832,196 B2 * | 12/2004 | Reich | 704/270.1 |
| 6,882,974 B2 * | 4/2005 | James et al. | 704/270.1 |
| 6,954,896 B1 * | 10/2005 | Dodrill et al. | 715/234 |
| 7,020,841 B2 * | 3/2006 | Dantzig et al. | 715/727 |
| 7,149,694 B1 * | 12/2006 | Harb et al. | 704/270.1 |
| 7,174,006 B2 * | 2/2007 | Guedalia et al. | 379/88.13 |
| 7,185,276 B2 * | 2/2007 | Keswa | 715/239 |
| 7,287,248 B1 * | 10/2007 | Adeeb | 717/136 |
| 7,289,606 B2 * | 10/2007 | Sibal et al. | 379/52 |
| 7,295,984 B2 * | 11/2007 | Glynn | 704/270.1 |
| 7,328,158 B1 * | 2/2008 | Burridge et al. | 704/270 |
| 7,331,036 B1 * | 2/2008 | Hambleton et al. | 717/105 |
| 7,334,050 B2 * | 2/2008 | Zondervan et al. | 704/270.1 |
| 7,356,472 B2 * | 4/2008 | Cross et al. | 704/270.1 |
| 7,389,234 B2 * | 6/2008 | Schmid et al. | 704/270.1 |
| 7,493,260 B2 * | 2/2009 | Harb et al. | 704/270 |
| 7,546,382 B2 * | 6/2009 | Healey et al. | 709/246 |
| 7,571,100 B2 * | 8/2009 | Lenir et al. | 704/270.1 |
| 7,698,435 B1 * | 4/2010 | Paterik et al. | 709/227 |
| 2002/0007379 A1 | 1/2002 | Wang et al. | |
| 2002/0010585 A1 | 1/2002 | Gachie et al. | |
| 2002/0032564 A1 * | 3/2002 | Ehsani et al. | 704/270.1 |
| 2002/0062216 A1 * | 5/2002 | Guenther et al. | 704/270.1 |
| 2002/0072914 A1 * | 6/2002 | Alshawi et al. | 704/270.1 |
| 2002/0107891 A1 * | 8/2002 | Leamon et al. | 707/513 |
| 2003/0018476 A1 * | 1/2003 | Yuen et al. | 704/270.1 |
| 2003/0046316 A1 * | 3/2003 | Gergic et al. | 707/513 |
| 2003/0091025 A1 | 5/2003 | Celi, Jr. et al. | |
| 2003/0125953 A1 * | 7/2003 | Sharma | 704/270 |
| 2003/0171926 A1 * | 9/2003 | Suresh et al. | 704/270.1 |
| 2003/0200080 A1 * | 10/2003 | Galanes et al. | 704/200 |
| 2004/0034531 A1 * | 2/2004 | Chou et al. | 704/270.1 |
| 2004/0093217 A1 * | 5/2004 | Yeh et al. | 704/270.1 |
| 2004/0107107 A1 * | 6/2004 | Lenir et al. | 704/270.1 |
| 2004/0128136 A1 * | 7/2004 | Irani | 704/270.1 |
| 2004/0172254 A1 * | 9/2004 | Sharma et al. | 704/270.1 |
| 2004/0205579 A1 * | 10/2004 | Brassell et al. | 715/513 |
| 2004/0225959 A1 * | 11/2004 | D'Orto et al. | 715/513 |
| 2005/0028085 A1 * | 2/2005 | Irwin et al. | 715/513 |
| 2005/0149331 A1 * | 7/2005 | Ehrlich | 704/270.1 |
| 2007/0233495 A1 * | 10/2007 | Agapi et al. | 704/270 |

OTHER PUBLICATIONS

Braudes, B., "COMVERSE: An Architecture for Supporting Multimodal Services & Applications in a Wireless Network", Int'l Eng. Consortium, (Nov. 2002).

U.S. Appl. No. 10/733,610, Cross, et al.

U.S. Appl. No. 10/849,642, Cross, et al.

Beckham, et al., "Towards SMIL as a Foundation for Multimodal, Multimedia Applications", http://www.cs.wisc.edu/~jbeckham/papers/eurospeech.pdf, 2001.

* cited by examiner

METHOD AND APPARATUS FOR VOICE-ENABLING AN APPLICATION

BACKGROUND

1. Field of the Invention

The present invention relates to command, control, and content navigation with respect to multimodal applications.

2. Description of the Related Art

Visual browsers are complex application programs that can render graphic markup languages such as Hypertext Markup Language (HTML) or Extensible HTML (XHTML). As such, visual browsers lack the ability to process audible input and/or output. Still, visual browsers enjoy a significant user base.

Voice browsers are the audio counterparts of visual browsers. More particularly, voice browsers can render voice markup languages such as Voice Extensible Markup Language (VXML), thereby allowing users to interact with the voice browser using speech. Voice browsers, however, are unable to process or render graphic markup languages.

Recent developments in Web-based applications have led to the development of multimodal interfaces. Multimodal interfaces allow users to access multimodal content, or content having both graphical and audible queues. Through a multimodal interface, the user can choose to interact or access content using graphic input such as a keyboard or pointer entry, using an audible queue such as a speech input, or using a combination of both. For example, one variety of multimodal interface is a multimodal browser that can render XHTML and Voice markup language, also referred to as X+V markup language.

To provide both graphic and voice functionality, developers are left with the option of developing a new multimodal browser/application or, alternatively, redesigning an existing visual browser/application to provide voice functionality. The complexity of visual browsers, and browsers in general, however, makes such efforts both time consuming and costly.

Further complicating the process of voice-enabling an application program, operations such as rendering content, command and control, and content navigation typically are distinct functions. Voice-enabling content refers to generating or playing an audible rendition of an electronic document such as a markup language document. Command and control pertains to graphical user interface (GUI) features such as commands that are accessible through menus and dialog boxes of an application. Content navigation pertains to the ability of a user to select hyperlinks presented within a rendered electronic document using voice, thereby causing a browser, for example, to load the document represented by the hyperlink. Thus, to speech enable an application program, efforts not only must be directed to voice-enabling the content, but also to voice-enabling command and control and content navigation functions of the application program.

SUMMARY OF THE INVENTION

The inventive arrangements disclosed herein provide a solution for speech enabling an application program for performing command and control and content navigation. In one embodiment, a library of voice markup language functions is provided. Through the voice library, an interpreter can be instantiated and passed a markup language fragment. The markup language fragment can specify a grammar that can be used to process received user spoken utterances.

One aspect of the present invention can include a method of voice-enabling an application for command and control and content navigation. The method can include the application dynamically generating a markup language fragment specifying a command and control and content navigation grammar for the application. The application can instantiate an interpreter from a voice library and provide the markup language fragment to the interpreter.

The interpreter can process a speech input using the command and control and content navigation grammar specified by the markup language fragment. An event can be provided from the interpreter to the application that indicates an instruction representative of the speech input.

Another aspect of the present invention can include a machine readable storage being programmed to cause a machine to perform the various steps described herein.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
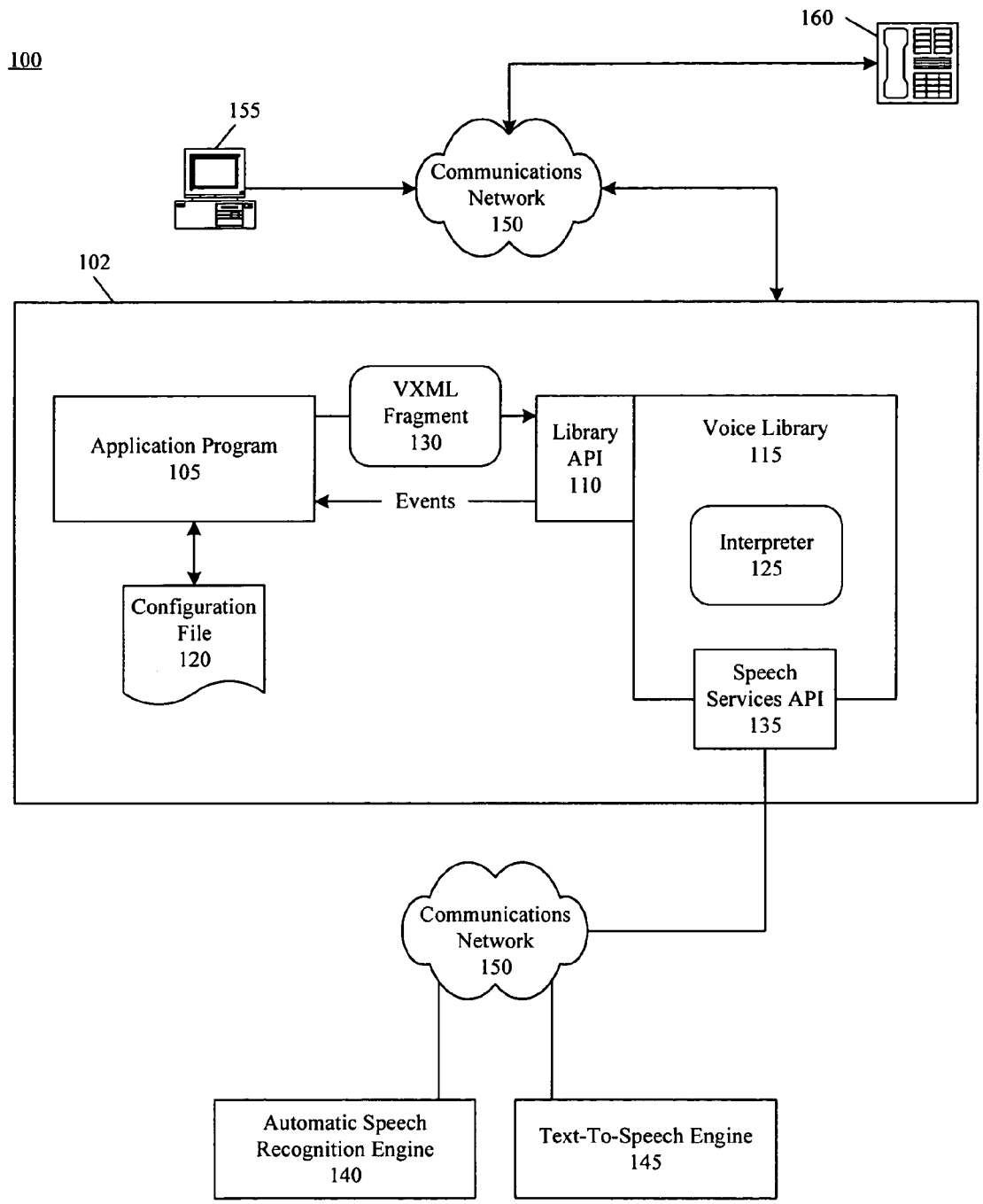
FIG. 1 is a schematic diagram illustrating a system for use in voice-enabling an application program in accordance with one embodiment of the present invention.

FIG. 1 is a schematic diagram illustrating a system 100 for use in voice-enabling an application program in accordance with one embodiment of the present invention. As shown, the system 100 can include a computer system 102 having an application program (application) 105 and a voice library 115. The system 100 further can include speech processing resources such as an automatic speech recognition (ASR) engine 140 and a text-to-speech (TTS) engine 145. As shown, the voice library 115 can run in the same address space as the application 105.

The computer system 102 can be a server for hosting one or more applications such as voice browsers, interactive voice response systems, voice servers, or the like. For example, in one embodiment, the application 105 can be a visual browser, or other application, that is to be voice or speech enabled. Accordingly, the application 105 can function as a multimodal browser once an interpreter 125 is instantiated. In another embodiment, the application 105 can be a voice server. In that case, the interpreter 125 can function as, or form, a voice browser. It should be appreciated, however, that the application 105 and the voice library 115 need not be located within the same information processing system. For example, each can be located within one or more different information processing systems communicatively linked via a suitable communications network. In one embodiment, the application 105 can be disposed within a user computing machine while the voice library 115 is disposed in a network computing machine that is remote from the user machine.

The voice library 115 can include modules configured to perform the various functions described herein. In one embodiment, the voice library 115 can include a function for instantiating an interpreter 125, for example upon request of the application 105. The voice library 115 can include a library application programming interface (API) 110 through which the application 105 and the voice library 115 can communicate. As such, the library API 110 provides the application 105 with access to the functions of the voice library 115.

The application 105 can call a function in the voice library 115 via the library API 110 to instantiate the interpreter 125. In one embodiment, the interpreter 125 can function as a voice markup language interpreter. The interpreter 125 can be configured to parse and render any of a variety of voice markup languages such as Voice Extensible Markup Language (VXML) or any subset thereof.

For example, in another embodiment, the interpreter 125 can be configured to render the subset of VXML used by the Extensible Hypertext Markup Language (XHTML) and Voice markup language, commonly referred to as X+V markup language. In this manner, the interpreter 125 can function in a complementary fashion with the application 105 to provide multimodal browsing. More particularly, the interpreter 125 can provide functions such as command and control and content navigation (C3N). As noted, command and control refers to the manipulation of an application through the use of application commands, for example those typically accessible via one or more menu constructs of the application. Content navigation refers to the ability to select hyperlinks presented or otherwise specified by a rendered markup language document, such that the content referenced by the hyperlink can be retrieved and presented through the browser or application.

The application 105 further can invoke another function referred to as "addLink". The addLink function of the voice library 115 can pass a VXML fragment 130, generated by the application 105, to the interpreter 125. The VXML fragment 130 can specify one or more link elements, containing C3N grammars, with which speech inputs to the application 105 can be matched. That is, the interpreter 125 can match speech inputs received from the application 105 with the C3N grammar(s). Upon detecting a match, the interpreter 125 can generate one or more events that are sent back to the application 105.

In cases where multiple devices may be enabled for multimodal interaction, a configuration file 120 can be included. The configuration file 120 can specify one or more different devices such as a telephone, mobile phone, home security system, dashboard audio/communication system, computer system, portable computer system, or the like. Within the configuration file 120, each device can be assigned an identifier that uniquely identifies that device. In one embodiment, prior to registering the VXML fragment 130 with the interpreter 125, the application 105 can access the configuration file 120 to obtain the identity of the device being used. Identifying information for the device can be substituted in a command object of the C3N grammar specified by the VXML fragment 130.

In consequence, the interpreter 125 can parse the command object and include that identifier in its response, i.e. an event, that is sent back to the application 105. In this manner, information passing to the application 105 from the interpreter 125 can be designated as corresponding to a particular device. Accordingly, the application 105 can service and interact with more than one device concurrently. Further, this functionality permits a user to personalize his or her particular device with a name unique to that device.

As noted, the system 100 can include speech resources such as the ASR engine 140 configured to convert speech to text and the TTS engine 145 for generating synthetic voice from text. Notably, an audio playback system (not shown) can be included for playing recorded portions of audio if so desired. The interpreter 125 can manipulate the speech resources through the speech services API 135. This allows the interpreter 125 to be implemented independently of the speech resources, thereby facilitating the use of speech resources from different vendors.

While the application 105 and the interpreter 125 can function in a cooperative manner, the ASR engine 140 and the TTS engine 145 need not be part of the same system. That is, in one embodiment, the processing resources can execute in one, or more other computer systems. Such computer systems can be proximate to, or remotely located from the computer system 102. For example, the speech resources can be provided as individual services that are accessible to the interpreter 125 and application 105 via a communications network 150, which can include, but is not limited to, a local area network, a wide area network, the public switched telephone network, a wireless or mobile communications network, the Internet, and/or the like. Still, in another embodiment, the resources can be located within a same computer system as the application 105 and/or the interpreter 125.

In operation, one or more instances of the interpreter 125 are created through function calls from the application 105 to the voice library 115. Once created, the application 105 can access the speech resources via the interpreter 125. That is, the interpreter 125 can render voice markup languages and access the ASR engine 140 and the TTS engine 145. Accordingly, voice services can be provided to a user accessing the computer system 102 via a telephone 160 or a computer system 155 over another communications network 150. C3N grammars can be provided or specified by the application 105 to the interpreter 125 through the passing of the VXML fragment 130. Information indicating matches to user speech, such as application 105 commands or content navigation commands, i.e. selections of hyperlinks, can be passed back to the application 105 from the interpreter 125 as one or more events.

The application program 105 can be synchronized with the interpreter 125 through events and state change information, i.e. through the addition of XML event listeners and state listeners. Events and state changes are propagated from the interpreter 125 to the application 105 through these event listeners. The application 105 uses the library API 110 for adding event and state change listeners to the interpreter 125. A listener is an object oriented programming technique for implementing a callback function. Using a state change event allows API's to function properly as some API's may fail if the interpreter 125 is in the wrong state. Accordingly, the application 105 can wait until the interpreter 125 is in the correct state, using the state change listener, before calling those API's that are sensitive to the internal state of the interpreter 125.

Figure 2:
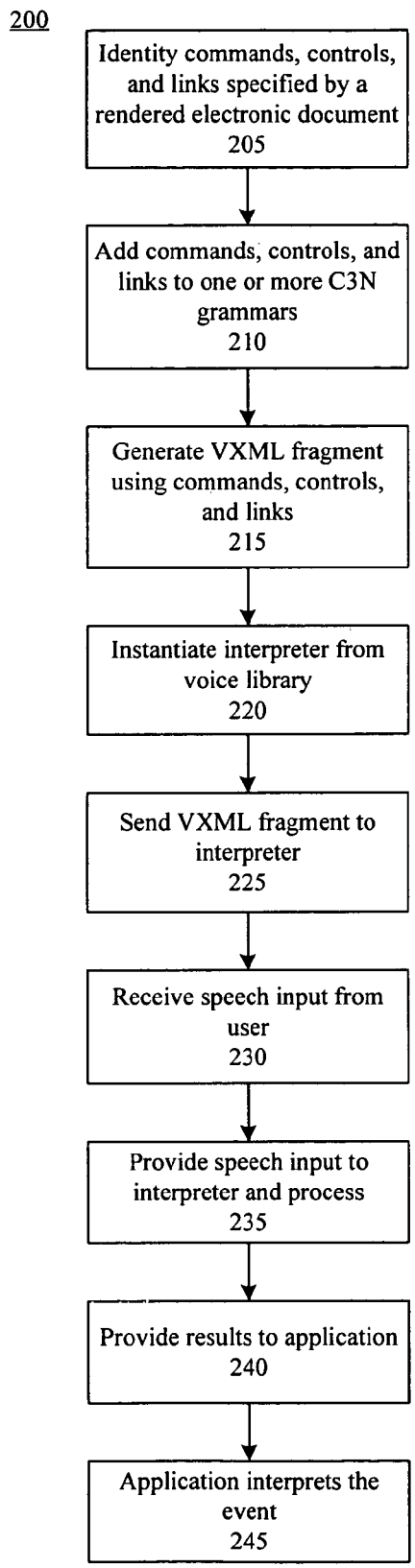
FIG. 2 is a flow chart illustrating a method of voice-enabling an application program in accordance with another embodiment of the present invention.

FIG. 2 is a flow chart illustrating a method 200 of voice-enabling an application program in accordance with another embodiment of the present invention. The method 200 can be performed by an application program having a need for voice processing functionality with respect to command and control and content navigation.

The method can begin in step 205, where the commands and controls of an application, and links specified by an electronic document rendered by the application can be identified. More particularly, the application itself can determine which commands and controls, for example those accessible via a menu construct, are available for user selection. Such a determination can depend upon the state in which the application is operating. For example, an application commonly makes particular menu items or functions available to users depending upon the state in which the application operates at any given time. As the instant invention can speech enable aspects of an application such as command and control and content navigation, those menu commands that are available or are active within the application program can be identified.

Additionally, links specified by an electronic document, such as those selectable within a page generated by rendering a markup language document, also can be identified. For example, Hypertext Markup Language (HTML) links can be identified within a HTML or other markup language document. Thus, any links, such as hyperlinks, that are displayed or are associated with displayable objects, can be identified.

In step 210, the identified commands, controls, and links can be added to one or more C3N grammars. In step 215, a VXML or other markup language fragment can be generated by the application. The VXML fragment can specify the C3N grammars to be used to recognize user specified commands pertaining to command and control and content navigation for the application.

Below is an example of a VXML fragment specifying a C3N grammar. As noted, the VXML fragment can be generated by the application and provided to, and registered with, an interpreter for use in processing a user speech input.

```
<vxml:link eventexpr="application.lastresult$.interpretation.c3n">
    <vxml:grammar>
        <![CDATA[
            #JSGF V1.0;
            grammar c3nfinal;
            public <c3nfinal> = <c3n> {$.c3n=$c3n;};
            <c3n> = browser (<comand> {$ = "comand."+
            $command} |
            <link> {$="link."+$link});
            <command> = <history> {$ = $history} | <file> {$=$file};
            <history> = [go] back {$ = "back"} | forward;
            <link> = ["go to" | "jump to" ] <documentlinks>
            {$=$documentlinks};
            <documentlnks> = Glossary {$="glossary.html"}
            | Contents {$="contents.html"}
            | Next Page {$="chapter3.html"}
            | Previous Page {$="chapter1.html"};
            ]]>
    </vxml:grammar>
    <catch event = "command link">
    <value expr="window.c3nEvent (application.lastresult$.intrepre-
    tation.c3n)"/>
    </catch>
</vxml:link>
```

In step 220, the application can instruct the voice library to instantiate an interpreter. For example, the interpreter instance can be created using a factory design pattern or a constructor. The application then can send the VXML fragment to the interpreter for use in recognizing received user speech in step 225. Accordingly, the VXML fragment can be registered with the interpreter.

In step 230, a speech input can be received by the application from a user. In step 235, the application can pass the speech input to the interpreter for analysis. The interpreter, using the C3N grammar specified by the VXML fragment as well as the speech resources, can resolve the speech input to an appropriate command, control, or instruction for content navigation, i.e. selecting a hyperlink. More particularly, the speech input can be converted to a textual representation of the speech input. While the textual representation can be a translation of what the user said, it also can include, or be converted to, other characters which when read by the application can cause the user intended action to occur.

The semantic interpretation builds an event string when a user's utterance is matched with an entry in the specified C3N grammar. By including the interpretation in the "eventexpr" attribute of the <link>, that string can then be raised as a user defined event. The <link> also can contain a <catch> element that processes the events generated by the semantic interpretation. In one embodiment, within a catch element, a Document Object Model (DOM) function "window.c3nEvent( )" can be executed, thereby passing the event string to the application.

As an example, and with reference to the VXML link already provided, if the user utters "browser, go back" the event expression attribute of the <link> containing "application.lastresult$.interpretation.c3n" resolves to the string "command.back". If the user utters "browser, go to next page", the expression attribute of the <link> resolves to "link.chapter3.html".

In step 240, the processing results from the interpreter can be provided back to the application. The event then can be raised in the application. The application can interpret the event in step 245. The application can interpret the event, for example a string, according to an event hierarchy established by the C3N grammar contained in the VXML fragment. In one embodiment, strings that start with "command." can be interpreted as menu commands, while strings starting with "link." can be interpreted as content navigation. In another embodiment, a DOM API called by the catch handler can interpret the event string.

While the method 200 has been descriptive of a single interpreter, it should be appreciated that multiple instances of the interpreter can be created and run. Accordingly, in another embodiment, a pool of one or more interpreter instances can be created by the application program. A threading policy can be established in the application program to facilitate the asynchronous operation of each of the interpreter instances.

Further, it should be appreciated that the process described herein can occur concurrently, or substantially concurrently, with content rendering. That is, the application can render an electronic document while speech inputs pertaining to C3N are received and processed. In illustration, when running a flight information application, i.e. executing one or more electronic documents providing such functionality, which asks a user for destination, date, and seating class, the present invention allows a user speech command of "browser go back" to be recognized, thereby causing the browser to display the previous page.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of voice-enabling an application comprising a visual browser that lacks the ability to process audible input and/or output, the method comprising:
dynamically identifying, via the application comprising the visual browser and based on a current state of the application, one or more commands and/or controls that are used to interact with the visual browser via graphic input and that are not responsive to speech;
generating, via the application comprising the visual browser, at least one markup language fragment specifying a voice grammar corresponding to the identified one or more commands and/or controls that are not responsive to speech;
instantiating, by the application and through a voice library of voice markup language functions, an interpreter by calling at least one function in the voice library via a library application programming interface (API) through which the visual browser and the voice library can communicate;
providing the at least one markup language fragment from the application that instantiated the interpreter to the interpreter for use in recognizing speech;
receiving, via the application, a speech input from a user;
receiving, via the application from the interpreter, an event specifying at least one of the identified one or more commands and/or controls, generated as a result of matching, by the interpreter, the speech input with the voice grammar specified by the at least one markup language fragment to resolve the speech input to the at least one of the identified one or more commands and/or controls so that the event includes at least one attribute specifying a semantic interpretation of the speech input thus rendering the at least one of the identified one or more commands and/or controls responsive to speech; and
interpreting the event via the application.

2. The method of claim 1, wherein the at least one of the identified one or more commands and/or controls specified by the event provided to the visual browser corresponds to a menu command.

3. The method of claim 1, further comprising:
determining an identity of a particular device from a plurality of devices using the visual browser; and
substituting the identity for a command object within the grammar specified by the at least one markup language fragment.

4. The method of claim 3, wherein the event provided to the visual browser specifies the substituted identity of the particular device.

5. The method of claim 1, further comprising:
generating, by the interpreter instantiated by the visual browser, the at least one of the identified one or more commands and/or controls specified by the event to be provided to the visual browser; and
catching the event using a handler specified by the at least one markup language fragment.

6. The method of claim 5, further comprising interpreting, by the visual browser, the event according to an event hierarchy specified by the grammar specified by the at least one markup language fragment.

7. The method of claim 1, said step of processing the speech input occurs substantially concurrently with rendering content within the visual browser.

8. A non-transitory machine readable storage having stored thereon a computer program having a plurality of code sections executable by a machine for causing the machine to perform a method of voice-enabling an application comprising a visual browser that lacks the ability to process audible input and/or output, the method comprising steps of:
dynamically identifying, via the application comprising the visual browser and based on a current state of the application, one or more commands and/or controls that are used to interact with the visual browser via graphic input and that are not responsive to speech;
generating, via the application comprising the visual browser, at least one markup language fragment specifying a voice grammar corresponding to the identified one or more commands and/or controls that are not responsive to speech;
instantiating, by the application and through a voice library of voice markup language functions, an interpreter, by calling at least one function in the voice library via a library application programming interface (API) through which the visual browser and the voice library can communicate;
providing the at least one markup language fragment from the application that instantiated the interpreter to the interpreter for use in recognizing speech;
receiving, via the application, a speech input from a user;
receiving, via the application from the interpreter, an event specifying the at least one of the identified one or more commands and/or controls generated as a result of matching the speech input with the voice grammar specified by the at least one markup and language fragment to resolve the speech input to the at least one of the identified one or more commands and/or controls so that the event includes at least one attribute specifying a semantic interpretation of the speech input thus rendering the at least one of the identified one or more commands and/or controls responsive to speech; and
interpreting the event via the application.

9. The non-transitory machine readable storage of claim 8, wherein the at least one of the identified one or more commands and/or controls specified by the event provided to the visual browser corresponds to a menu command.

10. The non-transitory machine readable storage of claim 8, wherein the method of voice-enabling the visual browser further comprises:
determining an identity of a particular device from a plurality of devices that use the visual browser; and
substituting the identity for a command object within a command and control grammar specified by the at least one markup language fragment.

11. The non-transitory machine readable storage of claim 10, wherein the event provided to the visual browser specifies the substituted identity of the device.

12. The non-transitory machine readable storage of claim 8, wherein the method of voice-enabling the visual browser further comprises:
generating, by the interpreter instantiated by the visual browser, the event to be provided to the visual browser; and
catching the event using a handler specified by the at least one markup language fragment.

13. The non-transitory machine readable storage of claim 12, further comprising interpreting, by the visual browser, the event according to an event hierarchy specified by the grammar specified by the at least one markup language fragment.

14. The non-transitory machine readable storage of claim 8, wherein said step of processing the speech input occurs substantially concurrently with rendering content within the visual browser.

* * * * *